（12） United States Patent
Shih et al.

(10) Patent No.: US 6,674,923 B1
(45) Date of Patent: Jan. 6, 2004

(54) METHOD AND SYSTEM FOR LOCATING AND ACCESSING DIGITALLY STORED IMAGES

(75) Inventors: Willy C. Shih, Pittsford, NY (US); Joseph A. Manico, Rochester, NY (US); Dale F. McIntyre, Honeoye, NY (US); James W. Holmes, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/536,521

(22) Filed: Mar. 28, 2000

(51) Int. Cl.[7] .................................................. G06K 9/60
(52) U.S. Cl. .................. 382/305; 382/306; 235/462.01; 705/1; 355/40
(58) Field of Search ................... 382/276, 305, 382/306; 358/403, 404; 707/1, 2, 3, 4, 5, 6, 7, 8, 9, 10; 355/40; 396/429; 705/1, 17, 41; 235/375, 383, 462.01

(56) References Cited

U.S. PATENT DOCUMENTS

| 4,553,261 | A | | 11/1985 | Froessl |
| 5,383,029 | A | | 1/1995 | Kojima |
| 5,682,540 | A | | 10/1997 | Klotz, Jr. et al. |
| 5,835,639 | A | | 11/1998 | Honsinger et al. |
| 5,859,920 | A | | 1/1999 | Daly et al. |
| 5,869,819 | A | | 2/1999 | Knowles et al. |
| 5,905,819 | A | | 5/1999 | Daly |
| 5,933,829 | A | | 8/1999 | Durst et al. |
| 5,938,727 | A | * | 8/1999 | Ikeda .......................... 709/218 |
| 6,061,738 | A | * | 5/2000 | Osaku et al. ................ 709/245 |
| 6,133,985 | A | * | 10/2000 | Garfinkle et al. ............. 355/40 |
| 6,141,684 | A | * | 10/2000 | McDonald et al. .......... 709/222 |
| 6,328,338 | B1 | * | 12/2001 | Sherman et al. .............. 281/42 |
| 6,427,032 | B1 | * | 7/2002 | Irons et al. .................. 382/306 |
| 6,429,923 | B1 | * | 8/2002 | Ueda et al. ................... 355/40 |
| 6,450,407 | B1 | * | 9/2002 | Freeman et al. ............ 235/492 |
| 6,493,720 | B1 | * | 12/2002 | Chu et al. ...................... 707/1 |
| 6,505,177 | B1 | * | 1/2003 | Drummond et al. .......... 705/43 |

FOREIGN PATENT DOCUMENTS

WO 98/40823 9/1998

* cited by examiner

Primary Examiner—Bhavesh M. Mehta
Assistant Examiner—Ali Bayat
(74) Attorney, Agent, or Firm—Frank Pincelli

(57) ABSTRACT

A hard copy print, method and system for producing the hard copy print. The hard copy print has a print side and a back side. The print side has information thereon which identifies the electronic location at which a digital record of the image can be accessed electronically. This information is preferably written in a machine readable form so as to allow automatic accessing of the digitally stored images. The system includes a digital storage device for storing of a digital record file of the image on the hard copy print.

28 Claims, 5 Drawing Sheets

METHOD AND SYSTEM FOR LOCATING AND ACCESSING DIGITALLY STORED IMAGES

FIELD OF THE INVENTION

The present invention relates to providing of image products and services. In particular to a product, method, and system of storing and retrieving of digital images.

BACKGROUND OF THE INVENTION

In the typical photographic process, an individual exposes a roll of photographic film and forwards the film to a photofinishing lab whereby it is developed and hard copy prints are produced therefrom. The developed film and hard copy prints are then returned to the customer. Once having received the hard copy prints, it is often desirable to obtain additional prints for oneself or for sharing with others.

Typically this is done by giving the hard copy prints to another individual or by using the returned negative for obtaining additional prints. Using the negative is desirable in obtaining the best possible image as the original images were captured thereon. However, this requires significant amounts of work in that the customer must first bring the negative to a photofinishing store for ordering of additional prints and then take the time to complete the order form. Quite often if a long time has elapsed since the receipt of the film, the negatives are often misplaced or lost and the customer must then use the hard copy prints for obtaining of additional prints.

It has been disclosed in the prior art a system wherein images after they have been developed are scanned digitally for obtaining of a digital record of the images. The digital record of the images are forwarded on to a memory storage database whereby the images are stored and can be accessed by the customer or by authorized individuals. An example is the Kodak PhotoNet Online™ System. While this system has been extremely useful, this requires an individual to be authorized to access the images and locate the images. Typically, this requires the customer to forward to the third party, a Universal Resource Locator (URL) in the form of a hyperlink for locating only the account containing the images. Additionally, the authorization must be provided with the third party being able to access the database.

Thus, there is a need to provide a system whereby access to the digitally stored images can be easily accomplished while still maintaining secure access to only authorized individuals.

SUMMARY OF THE INVENTION

In one aspect of the present invention there is provided a hard copy print having a print side and a back side, said print side having an image thereon, location information is provided on the print which identifies the electronic location at which a digital record of the image that can be accessed electronically, the hard copy print includes authorization for the spending of a predetermined amount of money on goods and/or services with respect to the images.

In accordance with another aspect of the present invention there is provided a system for locating a digital record file of an image provided on a hard copy print comprising:

a digital storage device for storing of digital images with respect to at least one customer, the digital storage device capable of being accessed electronically and having associated therewith a universal resource locator;

a remote access device for accessing the digital storage device using the URL;

a hard copy print having printed thereon a URL which can be read by the remote access device and allowing automatic access to the digital record file of the customer; and a printer for printing of the images provided on the image retaining element and a second printer device for printing information for identifying and allowing access to the digitally stored images at the storage device.

In accordance with yet another aspect of the present invention there is provided a method of locating a digitized image stored in an digital image storage device comprising the steps of:

attaching a unique identjifier to a copy print having the image thereon;

registering the unique identifier in a database which associates the location of the digital image in the digital image storage device, the unique identifier being associated with an electronic address for accessing the digital image at the digital image storage device; and providing information on the hard copy print which contains information regarding the amount of money available for ordering goods and/or services relating to the stored image.

In accordance with still another aspect of the present invention there is provided a method retrieving an image provided on a hard copy print comprising the steps of:

providing a hard copy print having a unique identifier for identifying the location at which a digital image record file of the image stored.

In accordance with still another aspect of the present invention there is provided a method for storing and retrieving of a digital image comprising the steps of:

obtaining a digital record of an image from an image retaining element;

creating a digital data file containing the digital image;

associating a customer with the digital file;

the digital file having an associated therewith a unique universal resource locator that can allow electronic access to the digital image;

providing a hard copy print of the image, the image having the URL for identifying access to the digital image, the URL being in the form of a machine readable code and also in a human readable form.

DETAILED DESCRIPTION OF THE INVENTION

Figure 2:
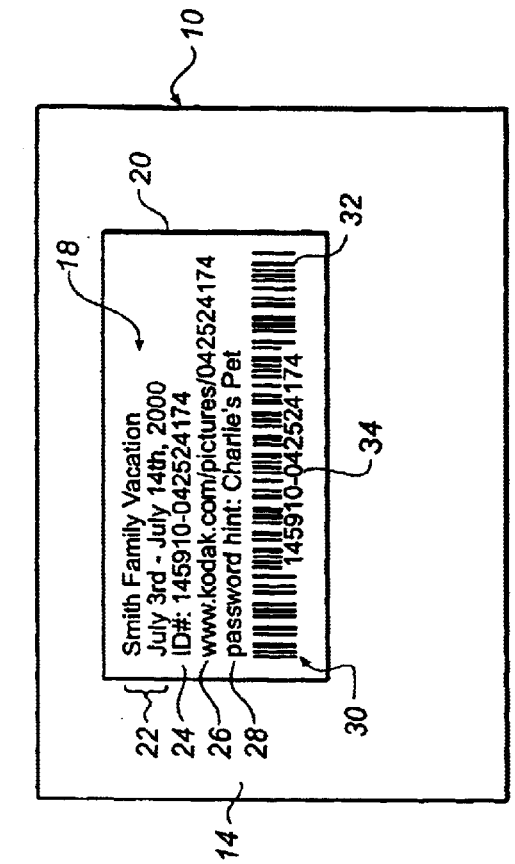
FIG. 2 is a back side of the hard copy print of FIG. 1.
Figure 1:
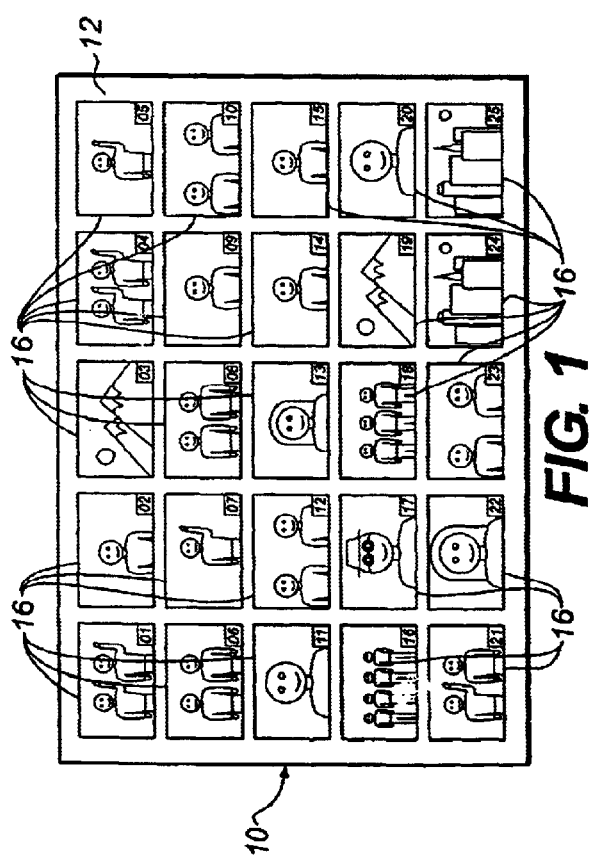
FIG. 1 is an elevational plan view of a hard copy print made in accordance with the present invention.

Referring to FIGS. 1 and 2 there is illustrated a hard copy print 10 made in accordance with the present invention. The hard copy print 10 has a front (print) side 12 and a back side 14. In the particular embodiment illustrated, the hard copy print 10 is a photographic print that has been produced by the typical photofinishing processes. The hard copy print 10 has a plurality of imagettes 16 which are representative of the images obtained from a single customer order, for example, a single roll of photographic film that has been processed and developed. In the embodiment illustrated, there are 35 imagettes 16, however, there may be any desired number. The imagettes 16 are generally low resolution images representative of the images that were developed on a roll of film. Quite often the hard copy print 10 is referred to as an index print. On the back side 14 of the hard copy print 10 there is provided information 18 indicating where the digital record of the high resolution digital images of the imagettes 16 may be electronically accessed. In the embodiment illustrated the information 18 is provided on a label 20 which has been secured to the back side 14 of the hard copy print 10 by the photofinisher for identifying the remote location where the high resolution digital images are stored. The information 18 may include additional information provided by the customer, the photofinisher, or other entity. In the particular embodiment illustrated, a plurality of information sections 22, 24, 26, 28 and 30 are provided. In particular, section 22 provides personal information regarding the source from which the images came such as the customer name, date, location at which the image was captured or some other personal information. This information may be obtained from the order form or from metadata provided on the roll of film that was originally processed. An example of film having metadata is the APS (Advanced Photo System) film currently on the market which allows the capability of providing data either optically or magnetically on the film which can be read and associated with the roll of film. The information section 24 may identify the source from which the images came. In the particular embodiment illustrated, the information section 24 includes information regarding the film identification (ID) from which the images were originally captured. Section 26 provides the URL where the high resolution images for each of the imagettes 16 are digitally stored. The URL would include the specific customer account under which the images are being stored and can be accessed. Section 28 provides a password hint for assisting the person in allowing access to the account under which the images have been stored. A password hint is preferably provided instead of the actual password so that individuals who accidentally come into possession of the hard copy print cannot go to the site and access the images. Only individuals that could associate the password hint with the actual password would be able to access the account. In the example illustrated, only individuals that knew "Charlie's pet" would be able to appropriately identify the password for accessing the account. In certain situations, the actual password may be provided. For example, if the customer is trying to advertise a product or service.

Section 30 provides a machine readable barcode 32 which includes the URL. The machine readable barcode 32 permits the automatic access to the site at which the images are stored. For example, the barcode 32 in section 30 would have information that allows bar code reading equipment to know that an URL is present and having appropriate capability to access the remote data base where the digital images are stored. Section 30 could also includes a human readable notation 34 which corresponds to the information provided in barcode 32 which may be used in the event that the barcode 32 can not be properly scanned or is not available.

In the particular embodiment illustrated, the information 18 is provided on a separate label 20 that is placed on the back side 14 of the hard copy print 10. It is of course understood that the information 18 may be printed directly printed on the back side 14 if so desired.

Figure 4:
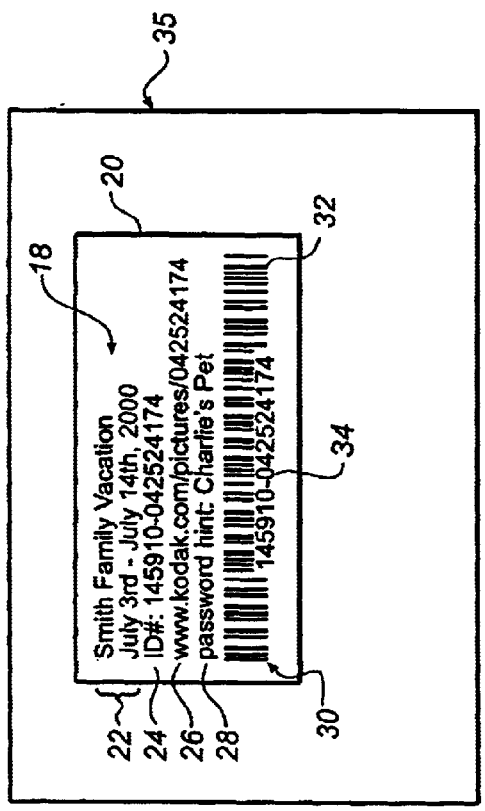
FIG. 4 is a back side of the hard copy print of FIG. 3.
Figure 3:
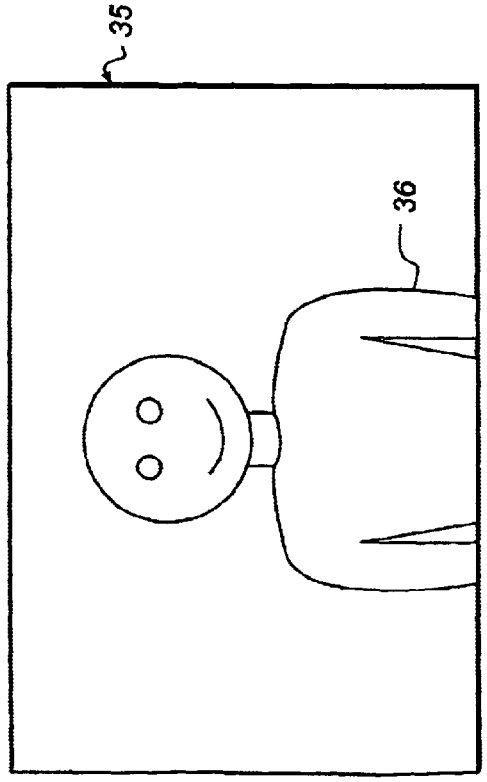
FIG. 3 is an elevational plan view of the front side of a modified hard copy print made in accordance with the present invention.

Referring to FIGS. 3 and 4, there is illustrated a modified hard copy print 35 made in accordance with present invention. The hard copy print 35 is similar to hard copy print 10 with like numerals indicating like parts and operation. However, in this embodiment instead of providing a plurality of imagettes 16 there is provided a single image 36. In this case, the URL in section 26 may point to the location of that image alone or to a group of images. For, example, but not by way of limitation, to all or a selected number of images in an order. The order may comprise images on an entire roll or any other customer image order. While it is known that the image 36 can be scanned from the original print 35, the information obtained from scanning would not be as good as the digital image record file obtained from the original scanned images, for example on the film, that are stored at the remote location. The digitally stored image was obtained from the original image capture element (for example, film) as opposed to a print obtained from the original capture element. Additionally, hard copy print 35 is subject to abuse from handling such as fingerprints, dust, and creasing and is known to fade with the passing of time. Thus, it would be more desirable to have access to the original stored digital file as opposed to the scanning of the hard copy print 35.

Figure 5:
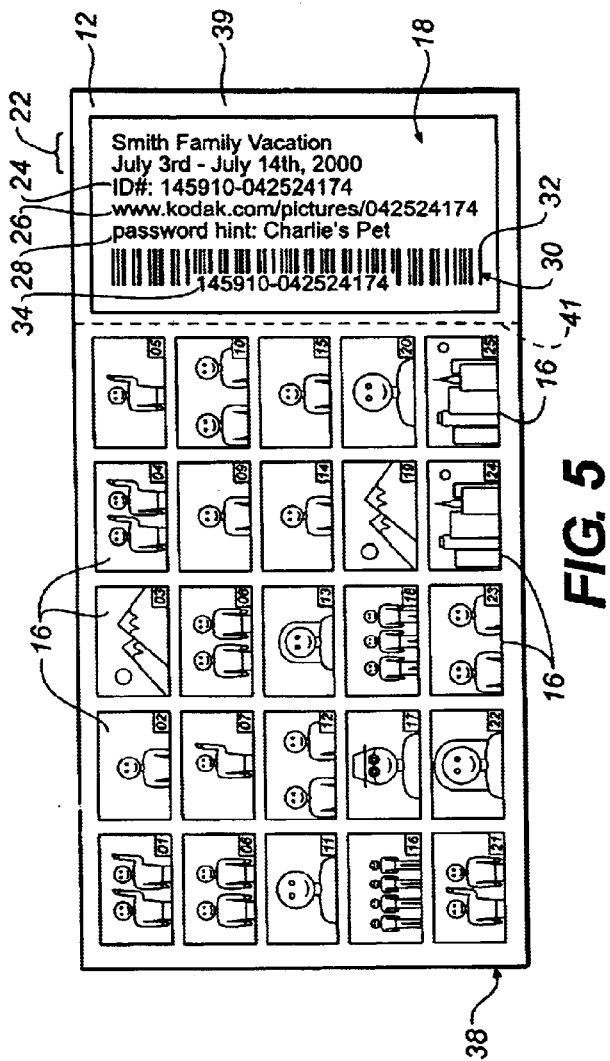
FIG. 5 is an elevational plan view of the front side of yet another modified hard copy print made in accordance with present invention.

Referring to FIG. 5, there is illustrated yet another modified hard copy print 38 made in accordance with the present invention, like numerals indicating like parts and operations previously discussed. In particular, hard copy print 38 is similar to hard copy print 10 except that the information instead of being placed on the back side 14 is placed on the front side 12 adjacent to imagettes 16. This may affect the size of the image 36 of hard copy print 35 or the size of the imagettes 16 on the hard copy print 10. In all other respects the hard copy print 38 is the same as hard copy print 10. While the print 38 is generally of a standard size print, such as a 4×6 inch (10.16×15.24 cm) or 4×7 inch (10.16×17.78 cm) format, the print may have any size or format desired. In the particular embodiment illustrated the information 18 is printed on a tab portion 39 which may detachable from the remaining portion of the print 38. An optional line of perforations 41 is provided for assisting in allowing tab portion to be removed.

Figure 7:
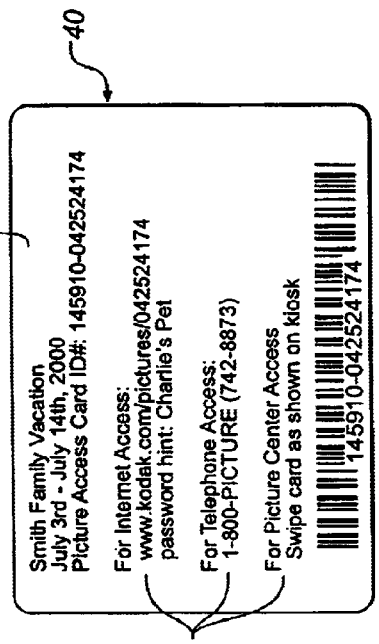
FIG. 7 is an elevational plan view of the back side of hard copy print of FIG. 6.
Figure 6:
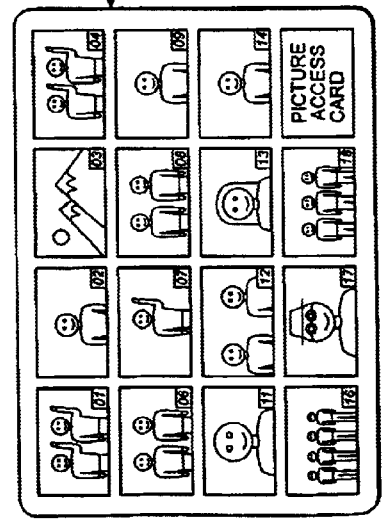
FIG. 6 is a back side of the hard copy print of FIG. 5.

Referring to FIGS. 6 and 7 there is illustrated another modified hard copy print/card 40 also made in accordance with the present invention. In this particular embodiment the hard copy print/card 40 has a form and size of a typical credit card or loyalty card. This would result in the imagettes being a little bit smaller than a typical index print. In this embodiment, the hard copy print/card 40 is designed for use in the scanning device in much the same way credit cards are currently used. The information 18 provided on the back side 14 of hard copy print/card 40 further includes an information section 42 that provides information for allowing telephone access to the remote electronic database. The hard copy print/card 40 also includes an information section 44 for providing directions for use of the print with respect to a reader. An instructional message is provided for advising the customer to swipe the hard copy print/card 40 on a kiosk reader so that the machine readable information provided in the machine readable bar code 32 can be automatically read. The kiosk can the automatically directly access the images by appropriate communication devices provided therein.

Figure 8:
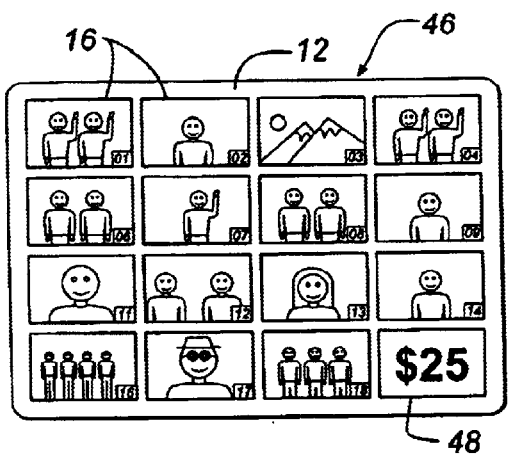
FIG. 8 is a elevational plan view of the front side of still another modified hard copy print made in accordance with the present invention.
Figure 9:
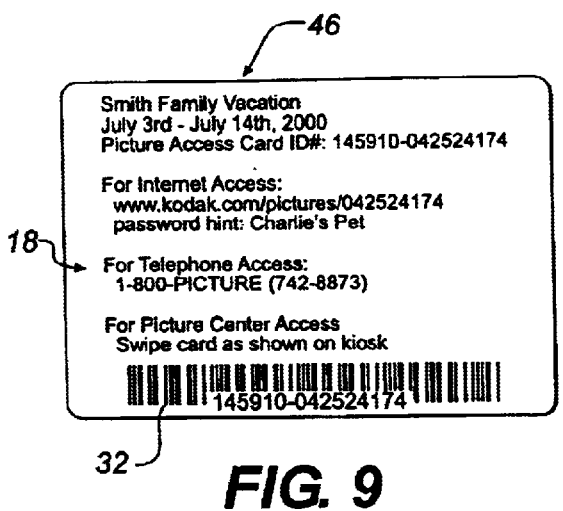
FIG. 9 is a elevational plan view of the back side of the hard copy print in FIG. 8.

Referring to FIGS. 8 and 9 there is illustrated yet another modified hard copy print 46 made in accordance with the present invention with like numerals indicating like parts and operation as previously discussed. Hard copy print 46 is very similar to hard copy print/card 40 except in this embodiment, there is a denomination section 48 on the front side 12 for indicating an amount of money that is available for use in obtaining goods and/or services relating to the imagettes 16. In the particular embodiment illustrated, denomination section 48 indicates that $25 worth of goods and/or services may be ordered with use of the hard copy print 46. Typically, this would comprise obtaining additional prints represented by the imagettes 16. However, any other goods or services may be provided, for example, but not by way of limitation, the ordering of clothing, mugs, cards, or other objects with an image thereon. When the hard copy print/card 40 is swiped into a reader and accessed to the appropriate database, there will be an indication that a certain amount of money is available for use in ordering goods and/or services. The database would preferably show the current amount available taking into account previous transactions related to hard copy print/card 40.

Figure 10:
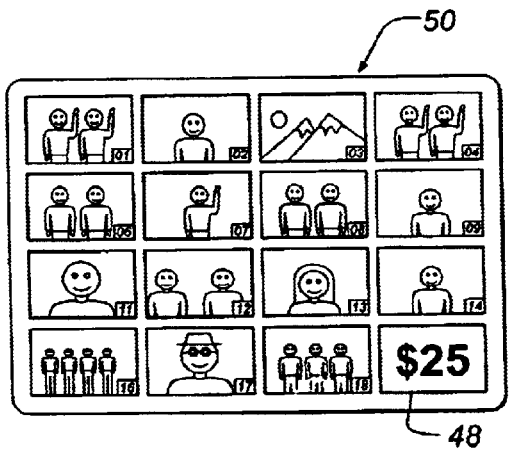
FIG. 10 is an elevational plan view of the front side of another modified hard copy print made in accordance with the present invention.
Figure 11:
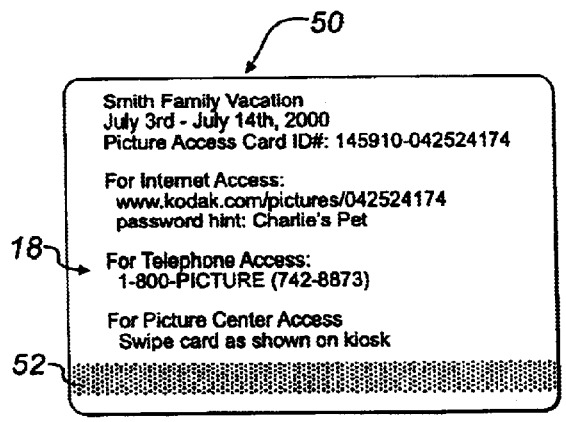
FIG. 11 is a plan view of the back side of the hard copy print in FIG. 10.

Referring to FIGS. 10 and 11 there is illustrated yet another modified hard copy print 50 made in accordance with the present invention. This embodiment is substantially identical to that illustrated in FIGS. 8 and 9, like numerals indicating like parts and operations. In this embodiment instead of using a barcode, a magnetic strip 52 is provided for magnetically encoding the URL which can be read and used for accessing the digital stored images at the remote location. In addition to storing information 18, the magnetic strip can be used to keep track of other information that is written thereon. For example, but not by way of limitation, the magnetic strip 52 may keep track of the amount of money available. As monies are spent, this amount is subtracted and written on to the magnetic strip 52.

Figure 12:
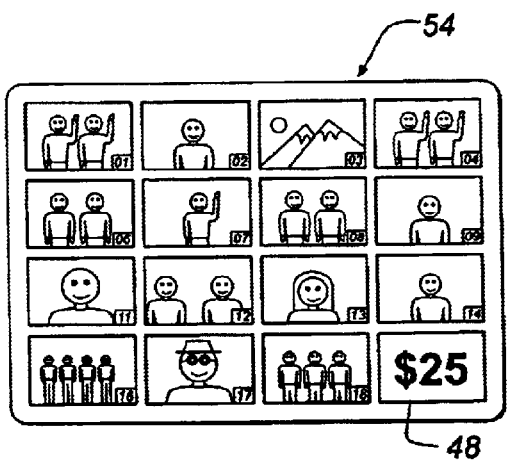
FIG. 12 is an elevational plan view of the front side of still yet another modified hard copy print made in accordance with the present invention.
Figure 13:
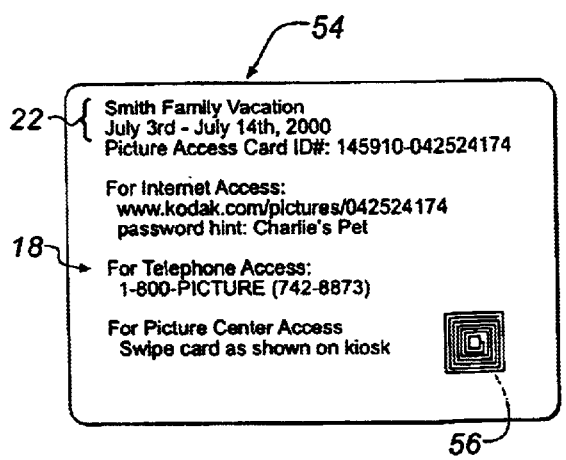
FIG. 13 is an elevational plan view of plan view of the back side of the hard copy print in FIG. 12.

Referring to FIGS. 12 and 13 there is illustrated yet another modified hard copy print 54 made in accordance with the present invention. Hard copy print 54 is similar to hard copy print 46 with like numerals indicating like parts and operations. In this embodiment instead of using a barcode, a radio frequency (RF) chip 56 is provided on hard copy print 54. An example of such device are TRIS devices sold by Texas Instruments. The RF chip 56 is passive until subjected to an RF field. An appropriated read device is capable of reading what is present on the RF chip 56 when it is exposed to an RF field. The read information can be relayed to a data base for confirming what is recorded thereon and/or for keeping track of what transactions have occurred. If the RF chip is of the programmable type chip then the RF chip 56 could be programmed. For example to allow a predetermined amount of money to be charged and as money is spent, this account balance is adjusted to reflect individual transactions.

It is to be understood that any other type of machine readable codes may be provided on hard copy prints 10, 40, 46, 50, and 54 other than that disclosed and described in the subject application.

Figure 14:
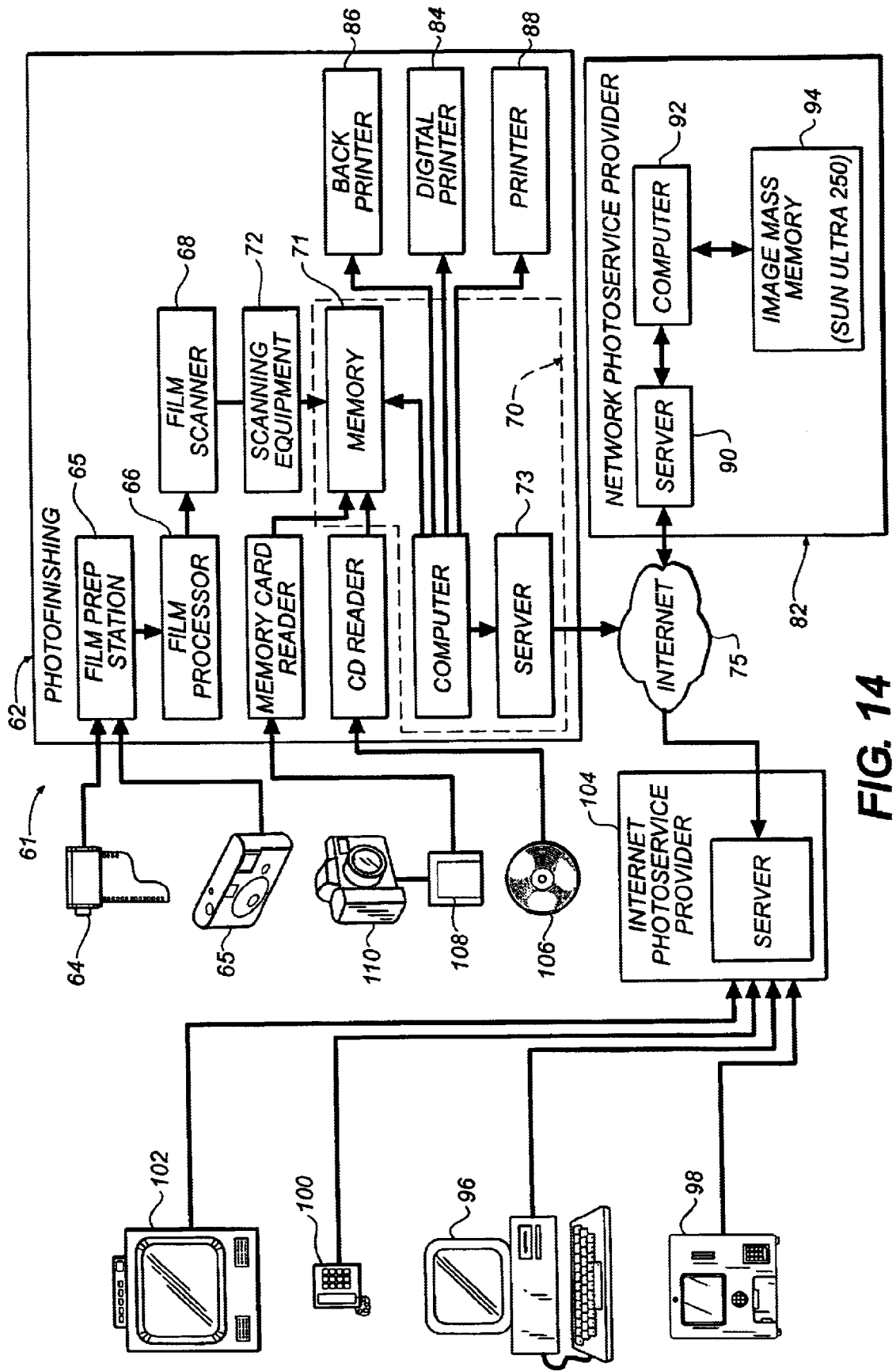
FIG. 14 is a schematic diagram of a system for storing and locating digital images made in accordance with the present invention.

Referring to FIG. 14, there is illustrated a system 16 made in accordance with the present invention. In the particular embodiment illustrated, the system 16 includes an image capture and printing section 62. In particular, the image capture and printing section 62 would typically be referred to as a photofinisher. In the embodiment illustrated, an exposed roll of photographic film 64 or single use camera 65 containing a roll of photographic film would be forwarded to the image capture and printing section 62 for developing and printing of hard copy prints. In a typical process, a plurality of rolls of exposed undeveloped film 64 would forward to a film prep station 65 where the film is sorted. The film is then passed through a film processor 66 wherein the images thereon are developed. Thereafter the film is sent to a digital image scanner 68 where the images contained on the roll of film 64 are digitally captured. The digitally captured images are sent to a memory section 71 of computer 70 where the images are associated with that particular customer order. A server 73 is provided for communication with the Internet 75. Other information on the film may also be obtained by additional scanning equipment 72. For example, optically or magnetically encoded information provided on the film can be read and forward to computer 70 and associated with the respective customer order. As is typical with most customer film orders, an order envelope is provided with the roll of photographic film to be developed. Appropriate instructional information on the envelope may also be obtained therefrom and associated with the customer order. For example, the customer order envelope may include additional information that is human readable or machine readable which can also provide instruction to the photofinisher on the products or services to be ordered, including the providing of a print with the information 18 as previously described and illustrated in FIGS. 1–13. Accordingly the images would be digitally scanned and stored under a customer's account at a digital image storage site. In the embodiment illustrated, this is accomplished by forwarding the digital image record file of the order to a network photoservice provider 82 over the Internet 75.

The digitally scanned images are sent to a printer 84 for printing of a hard copy print 10 such as illustrated in FIG. 14. For the purpose of clarity, reference will be made to hard copy print 10, it being understood that the other hard copy prints disclosed in FIGS. 3–13 may be substituted for hard copy print 10. The printer 84 in the embodiment illustrated is a digital printer that receives the digital record file of the scanned images. However, any suitable printer, such as an optical printer may be used for printing of the hard copy print 10. The printer 84 as previously discussed, causes the information 18 to be provided directly on the hard copy print 10, or on a separate label 20 which is applied to the hard copy print 10. Preferably, in order to avoid confusion it may be desirable to print the information 18 directly on the back side 14 of hard copy print 10 by the digital printer 84 or a secondary back printer 86. Alternatively, the hard copy prints 10 can go to another device 88 where a label printer will print and place the appropriate labels 20 on the back side 14 of the hard copy prints 10. In this regard, it is important that the hard copy print 10 be coordinated with the application of label 20 such that the appropriate label 20 is placed on the corresponding hard copy print 10.

The information 18 may be provided on each hard copy print 35 of a customer order or on a single index print 10 having a plurality of imagettes 16. If the information is provided on an index print, there is no need to provide the labels 20 on each of the prints in the same customer order, thus avoiding additional steps and cost in providing the labels for each print in the customer order. However depending upon the needs of the customer, the information 18 may be printed on some or all of the prints. The completed prints, including the hard copy print 10 with information on the back are sent to the customer. The customer, or other party having possession of the hard copy print 10, can then use the prints having information 18 thereon for accessing the digitally stored images at the network photoservice provider 82 as discussed later herein.

The network photoservice provider 82 has a server 90 capable of communication with the Internet 75. Server 90 is connected to a computer 92 for managing of digital images and associated information received. A mass memory storage device 94 is provided for storing of digital images and associated information. The digital images forwarded from the photofinisher 62 are assigned a location where the digital images are to be stored. Appropriate additional associated information is also to be stored. For example, the images would be associated with a particular customer account and an appropriate customer password. Thus, a customer would access the account using the appropriate customer password. In addition, the customer may authorize and/or request additional services. For example, but not by way of limitation, the customer could request long term storage and allow electronic access to the images over the Internet 75 by other parties. In such a case, an access password can be associated with the customer account. The access password could be associated with a password hint provided in information 18. The customer may utilize different access passwords for different individuals. The customer may also allow only restricted access to certain images to an individual. This may be accomplished by the initial order instructions provided by the customer when ordering the initial photofinishing order or at some later date by accessing the customer account over the Internet 75 using a personal computer 96 or other communication device that the customer can access. If the customer is using the service for the first time, an initial account can be set up. However, if the customer has used this service before, other information may be provided for associating later orders with the particular customer account, for example, on the initial order form (envelope). A standing order for this service can placed through the photofinisher 62 or network photoservice provider 82.

In place of a personal computer, a kiosk 98 may be used for the placement of the customer order to the photofinisher and/or the network photoservice provider 82. The kiosk 98 may be used in identifying goods and/or services to be associated with a customer's roll of film to be developed. The kiosk 98 may also be used to access the stored images as discussed later herein. An example of such a kiosk is described in co-pending application Ser. Nos. 09/492,063; 09/491,641 and 09/492,062. The kiosk 98 may also be used by a third party to access the digitally stored images as discussed later herein.

The digital stored images may also be accessed by various other remote devices 100 and 102 through an appropriate Internet Service Providers 104 and 96. It is of course understood that any number of remote locations or Internet Service Providers may be provided as desired. In the particular embodiment illustrated, the remote device 100 is a phone. The information 18 on the hard copy print/card 40 can be used to gain access to the images. The key pad of the phone could be used to make connection with the network photoservice provider 82 where the digital images are stored and make appropriate entries for ordering of goods and/or services. If the device 100 includes a display device, the images being accessed may be viewed so that the individual using device 100 can visually confirm the selections made.

Remote device 102 illustrates another example of how the images at the network photoservice provider 82 may be accessed. In particular device 102 may comprise set top box (cable TV box) that is used in association with a television for obtaining television stations over a cable TV line. The device 102 is used for accessing the network photoservice provider 82 and the associated television may be used to view the images being accessed. Additionally, the television may be used to receive visual and audio instruction or selections from the Network Service Provider 82.

The computer 96 may be used by the customer to order goods and/or services that he or she desires. In addition, the customer using computer 96 may access his account and provide the appropriate authorization for allowing access by third parties and provide appropriate password protection for both a customer password and an access password. This can be done before or after an order has been placed with the photofinisher 62.

After the photofinishing order has been completed with a hard copy print 10, the order including the hard copy print 10 is forward to the customer. If the customer has previously requested that the hard copy print 10 be sent directly to a third party, this will be done. The hard copy print 10 with the URL can be used to allow direct and quick access to the customer account by using the card including the information provided thereon. Access may be obtained by any of the remotely located devices 96, 98, 100 and 102.

Figure 15:
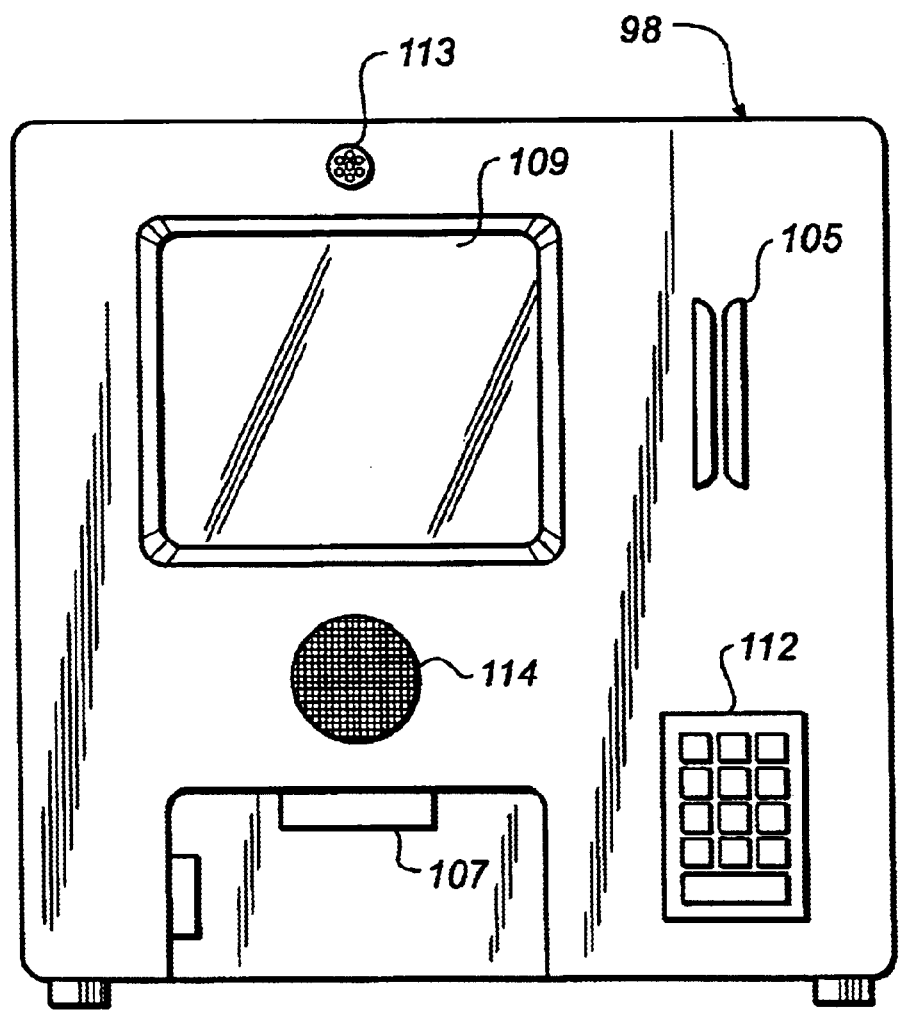
FIG. 15 illustrates a modified system made in accordance with the present invention.

Referring to FIG. 15, there is illustrated in greater detail the kiosk 100. The kiosk 100 includes an appropriate reading device 105 which can read the barcode, magnetic strip or other machine readable form that is provided on the hard copy print 10 as disclosed and discussed with respect to FIGS. 1–13. In the case of a card having an RF chip 56 as shown in FIGS. 12 & 13, the card need only be brought in the range of the reading device 105. Thus, a customer bringing up a hard copy print 10, such as shown in FIGS. 6–13 can swipe it through the reading device 105 (or pass it within range of a second reading device 107 if an RF chip is used). The kiosk 100 will recognize the code and automatically perform the appropriate communication link to where the images are stored thereby allowing immediate access to the image storage site without any further entry or other work on the part of the party using the kiosk. The kiosk also includes a display screen 109 and a data entry means 112, which in the embodiment illustrated is a key pad. Optionally, kiosk 98 may also have a microphone 113, and a speaker 114. Since the access password is not typically printed thereon, the third party would have to access only when using this password. Using the password hint provides the individual the ability to enter the appropriate password then allowing the third party to do whatever acts that they have been authorized by the customer. In the event a denomination of money has been allocated to an individual, that individual can use the card for ordering of goods and/or services associated that are available.

In the embodiment discussed above the images that are electronically stored at the remote network photoservice provider have been shown as originating from a roll of film. However, the present invention is not so limited. The digital record file of the images may be obtained from any source. As illustrated in FIG. 14, the digital images may be obtained from a CD 106 (compact disc), computer disc 108, a digital camera 110 or from a remote computer such as computer 96.

In the system 60 described above the Network Service Provider 82 is shown as a separate entity from the photofinisher 62. It is to be understood that that they could be the same entity located at the same place or separately located. In which case, the servers and/or computer may be combined as desired or appropriate.

A brief description on the use of the system 60 will now be provided. First a customer would provide images to be stored. This could be in the form of a roll of film, that is sent to a photofinisher, or images sent electronically or in a digital format to the photofinisher 62. Appropriate instructions will have been provided to the photofinisher that the images are to be stored electronically and that a hard copy print 10 is to be made incorporating certain images. The hard copy print 10 would be made having the information 18. Appropriate instructions on proper use could also be included. The customer may request that hard copy print 10 be returned to him or her, or that the print be delivered to a third party. If the print is delivered directly to a third party, an appropriate card having instructional information be provided advising the third party of the sender and how to use the hard copy print 10. Alternatively this additional information can be simply provide directly on the print 10. The recipient of hard copy print 10 would then use the card for obtaining electronic access to the images at the remote storage site. If the customer receives the hard copy print 10, it can be used by the customer or personally given to a third party.

The customer through computer 96, may access his/her account and allow electronic access to some or all of the images. In addition as previously discussed, access may be limited to certain individuals. Additionally, the customer may also authorize debiting of the customer account for a predetermined amount. This may be the same or different from a denomination amount provided on hard copy print 10. The recipient may use a reading device 105, such as provided on kiosk 100, for obtaining automatic and quick access. Once the individual obtains access to the site, the individual may do what ever is available to that individual.

In the embodiment discussed above the hard copy print 10 is made at the photofinisher 62. It may be possible that the hard copy print 10, generally having low resolution images, could be made at the customer home printer. The appropriate data, for a fee, could be downloaded to a home computer, which could include data for printing information 18 on a print. The home printed document could be used by the customer or sent to a third party for use. It may be possible that a scanner could scan the information and obtain the appropriate URL information for allowing the computer to automatically access the high resolution digitally stored image at the network photoservice provider 82. The software necessary for accomplishing this could be downloaded at the time the images are downloaded.

It is understood that various changes and modifications may be made in the course of the present invention. For example, while the information 18 is provided in human and machine readable form, the information could be provided of hiding certain information in the image itself. Such techniques as storing and hiding information in the image are disclosed and discussed in the corresponding U.S. Patent disclosed in U.S. Pat. Nos. 5,859,920; 5,905,819; and 5,835,639 which are hereby incorporated by reference and in pending U.S. Ser. No. 08/848,112, filed Apr. 28, 1997, by Chris W. Honsinger et al, entitled METHOD FOR GENERATING AN IMPROVED CARRIER FOR USE IN AN IMAGE DATA EMBEDDING APPLICATION. Additionally, instead of having a reader at a kiosk for reading of the information and/or machine readable code, a customer may have a scanner at home where it is possible to scan the image and using an appropriate algorithm provided can identify the URL in the barcode to be used by the third party to again access and locate the images at the image storage device. The program used for the interpreting of the scanned barcode may be downloaded as is currently done with many programs over the Internet 75. Additionally, this also allows the ability for the original customer to electronically forward digital data of the index print with the appropriate barcode thereon to the third party which can then be printed out at the customer's location and then be forwarded by the customer to any third party. Thus, a customized index print may be created by the customer for allowing access to certain identified images. Thereafter, the third party receiving the hard copy print 10 can directly access the digitally stored images.

The invention has been described in detail with particular reference to certain preferred embodiments thereof, but it will be understood that variations and modifications can be effected within the spirit and scope of the invention.

| PARTS LIST | |
|---|---|
| 10. | Hard copy print |
| 12. | Front print side |
| 14. | Back print side |
| 16. | Imagettes |
| 18. | Information |
| 20. | Label |
| 22. | Information section |
| 24. | Information section |
| 26. | Information section |
| 28. | Information section |
| 30. | Information section |
| 32. | Machine readable barcode |
| 34. | Human readable notation |
| 35. | Hard copy print |
| 36. | Image |
| 38. | Modified hard copy print |
| 39. | Tab portion |
| 40. | Hard copy print/card |
| 42. | Information section |
| 44. | Information section |
| 46. | Modified hard copy prints |
| 48. | Denomination section |
| 50. | Modified hard copy print |
| 52. | Magnetic strip |
| 54. | Modified hard copy print |
| 56. | Radio frequency chip (RF) |
| 62. | Printing section |
| 64. | Photographic film |
| 65. | Camera |
| 66. | Film processor |
| 68. | Digital image scanner |
| 70. | Computer |
| 71. | Memory section |
| 72. | Scanning equipment |
| 73. | Server |
| 75. | Internet |
| 82. | Network Photoservice Provider |
| 84. | Digital printer |
| 86. | Secondary back printer |
| 88. | Device |
| 90. | Server |
| 92. | Computer |
| 94. | Mass memory storage device |

-continued

PARTS LIST

| | |
|---|---|
| 96. | Computer |
| 98. | Kiosk |
| 100. | Remote device |
| 102. | Remote device |
| 104. | Internet Service Providers |
| 105. | Reading device |
| 106. | Compact disk (CD) |
| 107. | Reading device |
| 108. | Computer disk |
| 109. | Display screen |
| 110. | Digital camera |
| 112. | Data entry means |
| 113. | Microphone |
| 114. | Speaker |

What is claimed is:

1. A hard copy print having a print side and a back side, said print side having an image thereon, location information is provided on said print which identifies the electronic location at which a digital record of said image that can be accessed electronically, said hard copy print includes authorization for the spending of a predetermined amount of money on goods and/or services with respect to said images.

2. A hard copy print according to claim 1 wherein said information is placed on the back side of said hard copy print.

3. A hard copy print according to claim 1 wherein said information includes a URL.

4. A hard copy print according to claim 3 wherein said URL can be accessed over the Internet.

5. A hard copy print according to claim 3 wherein said URL is a phone number.

6. A hard copy print according to claim 3 wherein said URL is a printed in a barcode form.

7. A hard copy print according to claim 1 wherein said information is human readable.

8. A hard copy print according to claim 1 wherein said information is machine readable.

9. A hard copy print according to claim 1 wherein said information includes metadata regarding said images.

10. An apparatus according to claim 9 wherein said metadata includes a password hint for use in allowing access to said digital record file.

11. A hard copy print according to claim 1 wherein said hard copy print is a photographic paper upon which said image is printed.

12. A hard copy print according to claim 1 wherein said hard copy print is an index print having a plurality of images thereon.

13. A hard copy print according to claim 1 wherein said hard copy print comprises a customer loyalty or credit card.

14. A hard copy print according to claim 1 wherein said URL is printed in a barcode form.

15. A hard copy print according to claim 1 wherein said URL is printed using a two dimensional code.

16. A system for locating a digital record file of an image provided on a hard copy print comprising:
a digital storage device for storing of digital images with respect to at least one customer, said digital storage device capable of being accessed electronically and having associated therewith a universal resource locator;
a remote access device for accessing said digital storage device using said URL;
a hard copy print having printed thereon a URL which can be read by said remote access device and allowing automatic access to said digital record file of said customer; and
a printer for printing of said images provided on said image retaining element and a second printer device for printing information for identifying and allowing access to said digitally stored images at said storage device.

17. A system according to claim 16 wherein there is provided a scanner for obtaining images from an image retaining element and forwarding this on to an image storage device and associating a particular customer with said images being stored.

18. A system according to claim 17 wherein said second printer is a label printer for printing labels for placing on the back of said hard copy print produced by said first printer.

19. A system according to claim 17 wherein there is provided a scanner for the reading additional metadata off said image element for use in providing additional information for accessing said images.

20. A system according to claim 17 wherein said image retaining element is a roll of photographic film.

21. A system according to claim 16 wherein said first and second printers are provided on same device.

22. A system according to claim 16 wherein said remote access device comprises a kiosk having a machine readable device for reading of an encoded URL provided on said hard copy print.

23. A system according to claim 22 wherein said reading device is capable of reading the magnetic media containing information.

24. A system according to claim 22 wherein said reading device is capable of reading a barcode.

25. A system according to claim 22 wherein said reading device is capable of reading a two-dimensional code.

26. A system according to claim 22 wherein said reading device is capable of reading information on an RF chip.

27. A method of locating a digitized image stored in an digital image storage device comprising the steps of:
attaching a unique identifier to a hard copy print having said image thereon;
registering said unique identifier in a database which associates the location of said digital image in said digital image storage device, said unique identifier being associated with an electronic address for accessing said digital image at said digital image storage device; and
providing information on said hard copy print which contains information regarding the amount of money available for ordering goods and/or services relating to said stored image.

28. A method for storing and retrieving of a digital image comprising the steps of:
obtaining a digital record of an image from an image retaining element;
creating a digital data file containing said digital image;
associating a customer with said digital file;
said digital file having an associated therewith a unique universal resource locator that can allow electronic access to said digital image;
providing a hard copy print of said image, said image having said URL for identifying access to said digital image, said URL being in the form of a machine readable code and also in human readable form.

* * * * *